United States Patent
Jayakumar et al.

(10) Patent No.: US 9,912,580 B2
(45) Date of Patent: Mar. 6, 2018

(54) LINK FALLBACK

(71) Applicant: DELL PRODUCTS L.P., Round Rock, TX (US)

(72) Inventors: Avinash Jayakumar, Chennai (IN); Sivakami B.K., Chennai (IN); Joyas Joseph, Fremont, CA (US)

(73) Assignee: DELL PRODUCTS LP, Round Rock, TX (US)

( * ) Notice: Subject to any disclaimer, the term of this patent is extended or adjusted under 35 U.S.C. 154(b) by 189 days.

(21) Appl. No.: 14/681,903

(22) Filed: Apr. 8, 2015

(65) Prior Publication Data

US 2016/0301597 A1  Oct. 13, 2016

(51) Int. Cl.
*H04L 12/707* (2013.01)
*H04L 12/709* (2013.01)
*H04L 12/703* (2013.01)

(52) U.S. Cl.
CPC ............ *H04L 45/245* (2013.01); *H04L 45/28* (2013.01); *Y02B 60/33* (2013.01)

(58) Field of Classification Search
None
See application file for complete search history.

(56) References Cited

U.S. PATENT DOCUMENTS

| | | | |
|---|---|---|---|
| 2012/0275297 A1* | 11/2012 | Subramanian | H04L 45/245 370/225 |
| 2014/0036924 A1* | 2/2014 | Christenson | H04L 12/4641 370/395.53 |
| 2014/0192635 A1* | 7/2014 | Bao | H04L 41/0654 370/225 |
| 2014/0195694 A1* | 7/2014 | Sait | H04L 45/18 709/239 |
| 2015/0110105 A1* | 4/2015 | Kapur | H04L 45/245 370/389 |
| 2015/0117182 A1* | 4/2015 | Xu | H04L 12/4641 370/225 |
| 2015/0263991 A1* | 9/2015 | Macchiano | H04L 47/41 370/400 |

* cited by examiner

*Primary Examiner* — Eunsook Choi
(74) *Attorney, Agent, or Firm* — North Weber & Baugh LLP

(57) ABSTRACT

Various embodiments of the invention provide systems, devices, and methods of configuring and controlling the operation of fallback links within a network. In certain embodiments, this is accomplished by selecting an operationally active port and internally configuring it to be part of an uplink LAG to achieve minimal L2 connectivity. Compared with existing designs, the presented invention has reduced delay time, minimal impact on network traffic, increased fallback bandwidth, faster convergence, and prevents link flaps of downstream server ports. In line with the IOA's plug- and play philosophy, no administrator intervention or reprogramming of VLANs is required in selecting fallback links.

16 Claims, 7 Drawing Sheets

LINK FALLBACK

BACKGROUND

A. Technical Field

The present invention relates to communication networks and devices and, more particularly, to systems, devices, and methods of configuring and controlling the operation of a link fallback within a network.

B. Background of the Invention

A blade switch device known as I/O aggregator (IOA) is a zero-touch device that is a plug-and-play type of switch that allows administrators and users to connect a device within a server chassis and expect the device to obtain network connectivity without any further intervention by the administrator, such that once the device is connected to the chassis, the desired connectivity is established without necessitating the configuration of any additional protocols.

In an IOA configuration, Link Aggregation Control Protocol (LACP) link fallback is a useful feature that aids server administrators to bring up server ports during installation and when performing troubleshooting tasks. In addition, a server administrator can, for example, verify network connectivity and server parameters without requiring input from a network administrator.

Typically, during a start-up procedure, a boot protocol will automatically provision all uplink ports of the IOA into a Link Aggregation Group (LAG). However, in scenarios where no Link Aggregation Control Protocol Protocol Data Units (LACPDUs) are received on these ports, for example because the uplink (Top-of-Rack) TOR has not been configured for LAG operation yet, the LAG session is not established, and the LAG remains in an inactive state. As a consequence, based on Uplink Fault Detection (UFD), the uplink ports on the IOA are not activated, such that the state of a corresponding downlink server port interface also remains inactive. In other words, if the uplink LAG is operationally inactive, the UFD feature of the IOA negatively impacts the connectivity from the IOA to the outside world and brings down the downlink ports of the servers as well. Since the condition of the server ports is, thus, decided by the state of the uplink LAG, once the uplink ports are inactive, none of the downlink servers will have network connectivity to communicate with other network devices.

FIG. 1 shows an example of a general network operating in IOA mode. System 100 comprises server chassis 102, servers 106, network blade switch (IOA) 108, and TOR 112. Server chassis 102 typically comprises up to 32 servers 106 and IOA 108. Network connectivity between servers 106 and TOR 112 is achieved through IOA 108. Typically, four or eight uplink ports 110 are connected to TOR 112. Uplink ports 110 that connect IOA 108 to TOR 112 constitute a logical entity in which a set of links is grouped and serves as gateway to the outside world. Downlink ports 120 provide connectivity between IOA 108 and downstream servers 106.

Server chassis 102 is typically maintained by a server administrator, while TOR 112 is maintained by a network administrator. In operation, once the server administrator connects IOA 108 between server 106 and TOR 112, and the network administrator configures TOR 112, e.g., by connecting links 110 accordingly, network connectivity is established and links 110 are, at an L2 link level, are considered to be in an operationally active condition, such that the status of links 110 is discoverable by devices such as IOA 108.

By default, IOA 108 treats uplink ports 110 as LAG 114. For LAG 114 to reach an active status, a corresponding matching LAG configuration on TOR 112 is required. Assuming an LACP configuration is present only on IOA 108, but no corresponding configuration exists on TOR 112, then no LACPDUs are being received from TOR 112 and no LAG session can be established resulting in LAG 114 remaining in an inactive state. Then, if uplink ports 110 on IOA 108 are inactive, for example based on UFD, the corresponding connection between downlink server 106 ports and IOA 108 also remain in an inactive state, such that none of servers 106 has network connectivity to communicate with the outside world. In order to overcome this problem, numerous attempts have been made. However, each approach has significant shortcomings.

One traditional approach provides an LACP link fallback option that encompasses an internal implementation that brings down uplink port channel 110, removes one of links 110 (e.g., port 1) from LAG 114 on IOA 108, and then configures it as a separate, plain L2 port in order to provide network connectivity with TOR 112. However, this approach suffers from various limitations and has additional requirements that system 100 must satisfy. First, elected port 110 has to be part of all the 4K Virtual Local Area Networks (VLANs) for L2 connectivity from the server to TOR 112. Second, elected port 110 is to be made part of the UFD group to monitor and modify the operational status of the ports of server 106 based on the current uplink connectivity to TOR 112. Third, elected port 110 must be programmed as a multicast router port for IGMP snooping. Fourth, election of the fallback link and L2 port can occur only after a number of trial attempts and expiration of a timeout period before confirmation can be obtained that LACPDUs are no longer received, all of which causes undesired network delays.

Finally, since the uplink port channel is down, i.e., LACP LAG 114 goes inactive, while the port is removed, the ports of downlink server 106 will experience a flap, i.e., a change in activity state that temporarily halts or drops traffic until link 110 is re-activated. In fact, due to UFD, a drop in network connectivity occurs on each flap; port 110 will need to be moved back as part of the port-channel; and IGMP and 4K configurations will need to be removed from elected port 110, further adding to the delay and slowing down convergence.

One existing approach, known as LACP "force-up," is a mechanism that allows administrators to statically choose a particular link. However, in IOA mode IOA 108, which is plugged into server chassis 102, will have neither preexisting information nor control over which specific uplink could be operationally active with TOR 112, such that the static approach of designating a particular port fails in circumstances in which the port is inactive or simply not connected.

In yet another existing approach, static uplink LAG 114 cannot be kept as a static LAG, as IOA 108 will have multiple uplink ports 110, and if all are made operationally active within LAG 114, this creates the possibility that downstream server 106 receiving multiple copies of a packet in case of Broadcast, Unknown unicast, and Multicast (BUM) traffic.

What is needed are tools for network architects and administrators to overcome the above-described limitations.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that this is not intended to limit the scope of the invention to these particular embodiments.

FIG. 1 shows an example of a general network operating in IOA mode.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention.

Figure 1:
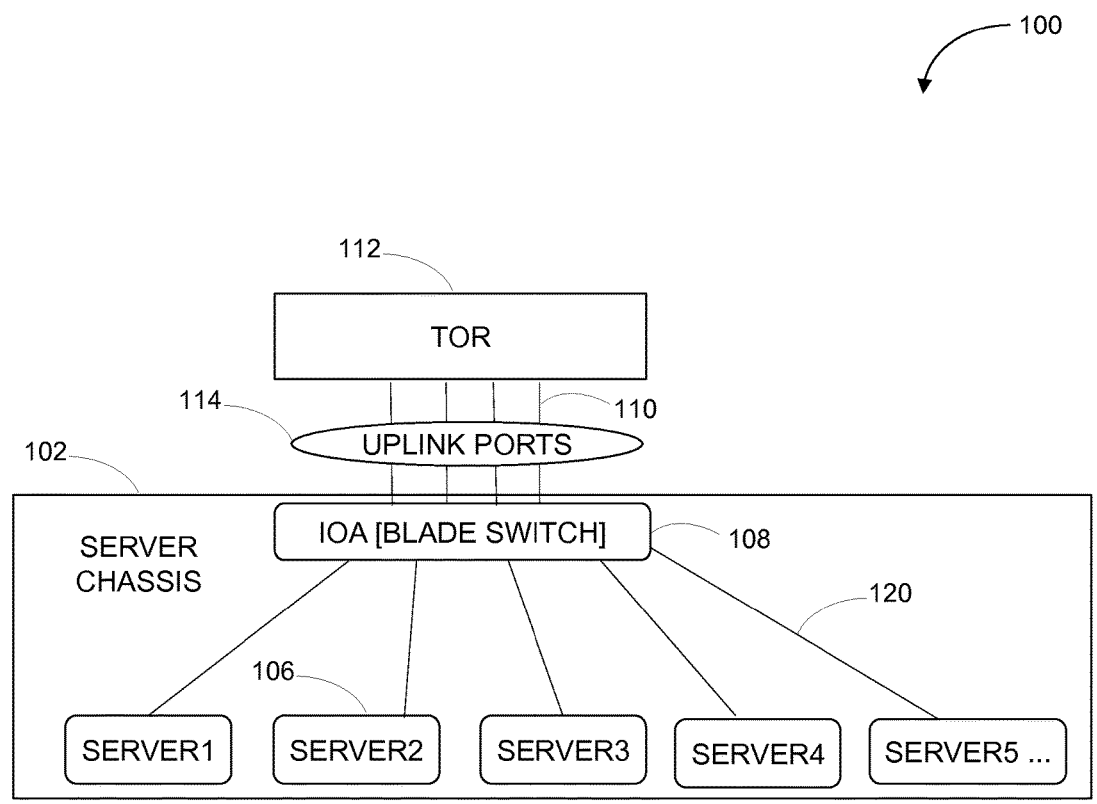
Figure 2:
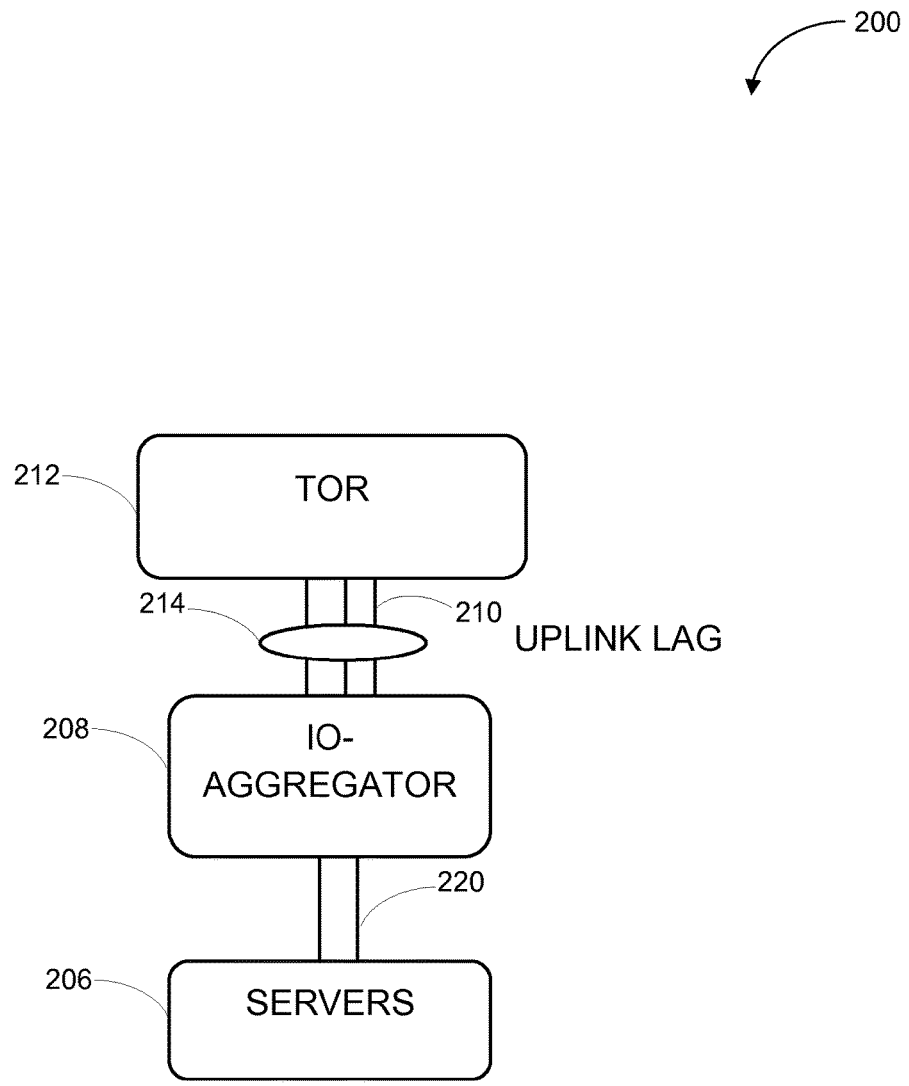
FIG. 2 is an exemplary LACP link-fallback topology operating in IOA mode, according to various embodiments of the invention.

FIG. 2 is an exemplary LACP link-fallback topology operating in IOA mode, according to various embodiments of the invention. System 200 comprises servers 206, IOA 208, and TOR 212. For clarity, components similar to those shown in FIG. 1 are labeled in a similar manner. For purposes of brevity, a description of basic functions is not repeated here.

In operation, again, assuming that there is an LACP configuration present only on IOA 208, but no corresponding configuration exists on TOR 212, such that no LACP-DUs are being received from TOR 212, in a manner similar to FIG. 1, no LAG session can be established. In these situations, in one embodiment, IOA 208 in FIG. 2 selects and internally configures as a fallback link one of link 210 that is operationally active at the L2 level so as to ensure connectivity. IOA 208 may mark the fallback link as a static link to configure it as an operational member link of LAG 214, i.e., statically adding the fallback link to LAG 214, such that even if no LACP packets are transported LAG 214 continues to be active at an L2 level. Advantageously, this prevents link flaps of downstream server ports 206.

In detail, in order to ensure connectivity, selected link 210 has a known L2 level state that indicates that that link 210 is connected to another device, e.g., a peer device. IOA 208 defines that the selected link 210 is a member of uplink LAG 214. As a result, once the server administrator connects one of links 210 to IOA 208 to establish connectivity between downstream server 206 and TOR 212, IOA 208 detects that LAG is not configured on link 210 even if configurations on downstream server 206 may be properly made and verified. Nevertheless, IOA 208 provides basic L2-connectivity to link 210. In addition, once the administrator configures LACP on TOR 212, TOR 212 will commence sending LACPDUs.

In one embodiment, once IOA 208 receives an LACP packet on any additional link other than selected fallback link 210, for example in response to the administrator configuring LACP, IOA 208 removes the initially elected, static fallback link 210, and replaces it and its function with a new, unelected link (through which the LACP packet has been received) as the current operational link in LAG 214, which may have multiple operational members. This gives the new link preference and makes it part of LAG 214. At this point, regular LAG functions can take over and LAG 214 continues to be active. In effect, the elected link is removed as an operational link and is replaced with the unelected link.

As a result of these transitions that appear as internal state transitions within LAG 214, the network administrator need not (re)configure or (re)program network 200 (e.g., egress programming at the ASIC to avoid undesirable loops involving traffic though uplink ports) or stop the routing of LAG traffic until LAG 214 is configured, e.g., after LCDP packets are received, in order to obtain network connectivity.

Figure 3:
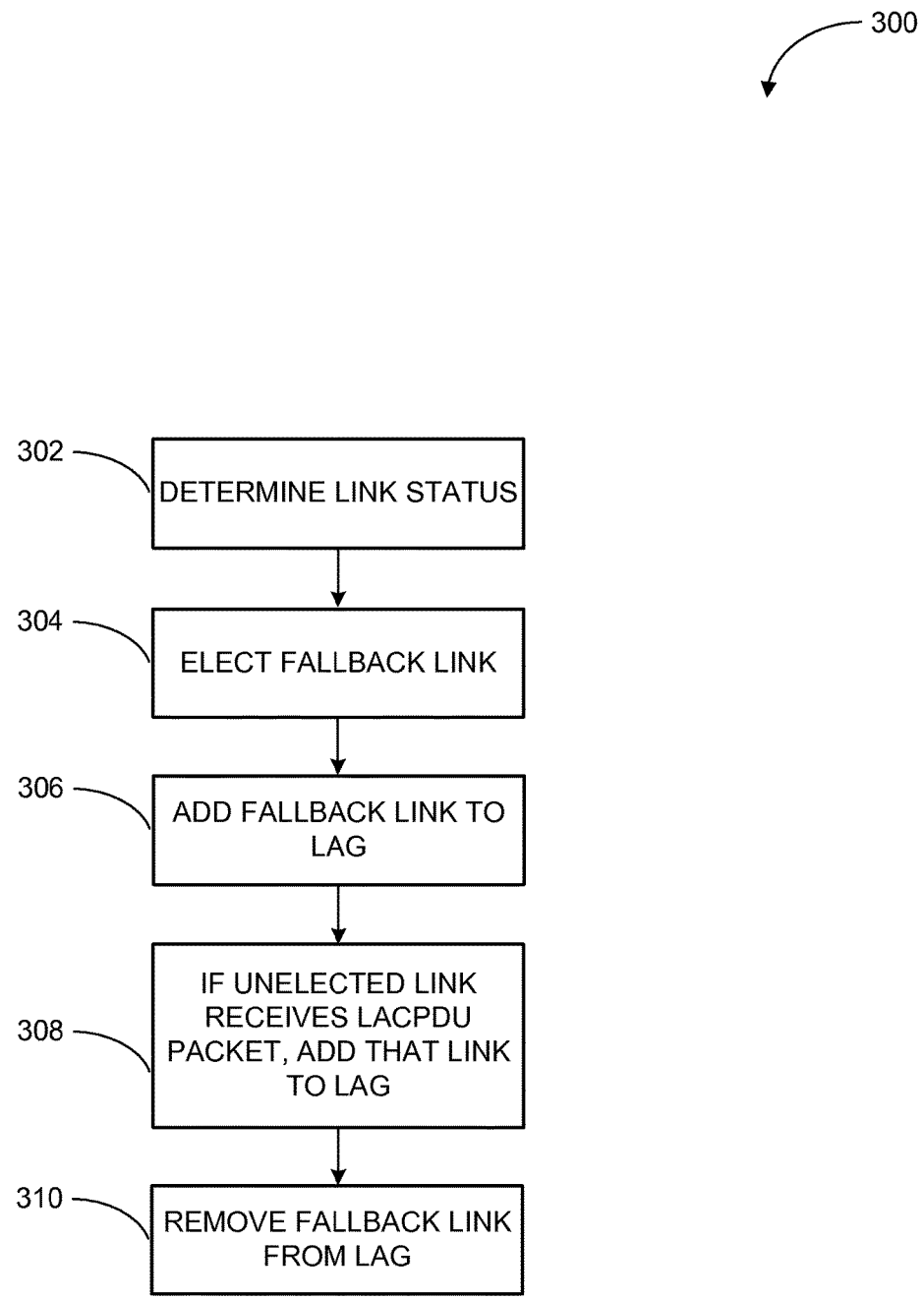
FIG. 3 is an exemplary flowchart illustrating a process to obtain network connectivity using a link-fallback system operating in IOA mode, according to various embodiments of the invention.

FIG. 3 is an exemplary flowchart illustrating a process to obtain network connectivity using a link-fallback system operating in IOA mode, according to various embodiments of the invention. Process 300 begins at step 302 by determining that a link is inactive, for example, by determining that the LAG configuration on the IOA side of a network has no corresponding LAG configuration on the uplink port side (i.e., the uplink TOR side).

At step 304, the fallback link is elected, e.g., as a static link from uplink ports in an LACP LAG that are operationally active. (i.e., have basic L2 connection to another peer device or other device).

At step 306, the fallback link, which may be an operationally active member of a LAG, is added to the LAG. This may be accomplished by configuring the static link as part of the uplink LAG. The elected, added link serves as a fallback link, such that the LAG becomes active and packets can flow through the LAG while avoiding link flaps and without the need to reconfigure or reprogram the IOA. This is because the resulting transitions are confined internally within the LAG.

At step 308, if an unelected link receives LACP packets, the unelected link is added to the LAG and, at step 310, the elected link is removed as an operational link from the LAG.

It will be appreciated by those skilled in the art that fewer or additional steps may be incorporated with the steps illustrated herein without departing from the scope of the invention. No particular order is implied by the arrangement of blocks within the flowchart or the description herein.

Figure 4:
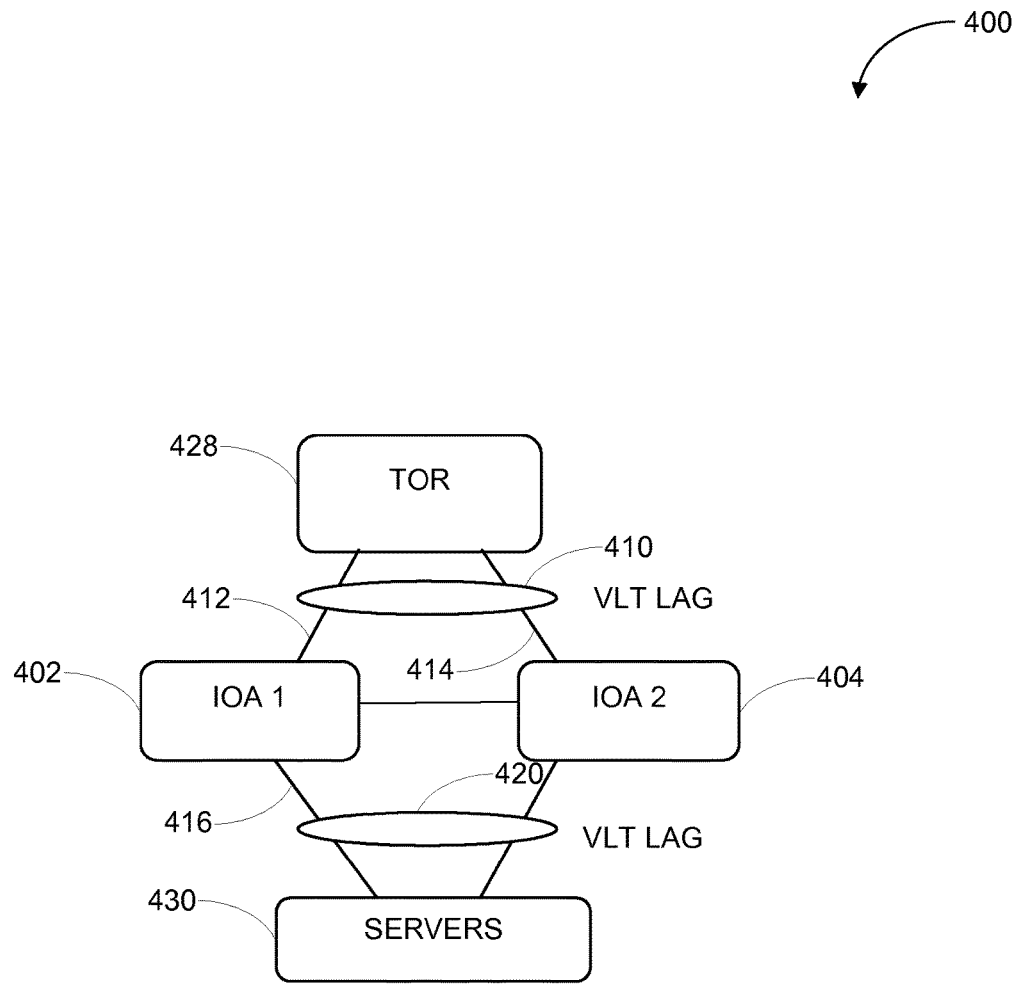
FIG. 4 illustrates an exemplary link-fallback system in a VLT topology comprising overlapping VLANs, according to various embodiments of the invention.

FIG. 4 illustrates an exemplary link-fallback system in a VLT topology comprising overlapping VLANs, according to various embodiments of the invention. System 400 comprises IOA1 402, IOA2 404, VLT LAG 410, 420, links 412-418, TOR 428, and downstream servers 430. Ports 412 and 414 are uplink ports that respectively connect IOA1 402 and IOA2 404 to TOR 428, while downlink server ports 416 and 418 are connected to servers 430 to facilitate network connectivity between servers 430 and TOR 428. IOA1 402 and IOA2 404 represent VLT nodes that, in this example, are connected via ICL 422.

In operation, IOA1 402 and IOA2 404 may operate as VLT nodes that treat uplink ports 412-414 as part of VLT LAG 410. Similarly, IOA1 402 and IOA2 404 treat downlink ports 416-418 as part of VLT LAG 420. In one embodiment, in response to receiving no LCAP PUD packets, each node in the VLT domain in FIG. 4 elects a fallback link among its operationally active uplink ports 410-412 to be added to VLT LAG 410. Once elected and added to VLT LAG 410, the fallback link enables LAG 410 to carry packets. Compared to traditional approaches where only a single link can be chosen from either of the two devices (e.g. 1 out of 5+5=10 links), this embodiment in effect doubles the total fallback bandwidth available to VLT system 400 to reach TOR 428. One of ordinary skill in the art will appreciate that the ultimate election may be made, for example, between otherwise equal operationally active links based on their lowest port numbers.

In one embodiment, when VLT LAG 410 is active in the VLT domain, system 400 identifies one of VLT nodes 402-404 as inactive. Identification may be based on a priority-based mechanism (e.g., MAC address) that ensures that one node can be elected as the active node, thus, avoiding the possibility of deadlock. System 400 further configures an ingress mask on the identified and inactive node that, once identified, is programmed to drop BUM traffic that is sent by TOR 428 and ingresses on the fallback link associated with that node. As a result, duplicate packets of BUM traffic that would otherwise reach the downstream server 430 are prevented from doing so. In other words, even if TOR 428 forwards broadcast traffic to both ports (e.g., link 1 and link 2), such that one packet will come through IOA1 402 and the other through IOA2 404, the dropping ingressing traffic avoids duplicate BUM traffic on servers 430 connected to both IOA1 403 and IOA2 404.

In one embodiment, BUM traffic is egress-filtered on ICL 422 to prevent the forwarding of BUM traffic over ICL 422 to a VLT peer or the LAG of the VLT peer. In one embodiment, if IOA1 402 receives traffic sent by server 430 and destined for VLAN 10 (not shown) located between TOR 428 and IOA1 402, and there are no ports on IOA2 404 that are members of VLAN 10, then ICL 422 will reject and drop traffic on IOA2 404 since there are no suitable receivers. In this operating mode, the UFD feature is disabled on both nodes 402, 404 to establish connectivity from downstream servers 430 that are connected to nodes 402, 404 to TOR 428 over a fallback link.

In one embodiment, servers 430 may be connected to TOR 428 via a statically programmed portchannel bundle that has a single link as part of uplink VLT LAG 412, 414 in order to ensure that the VLT feature of network 400 is maintained. Once either of IOA1 402 or IOA2 404 receives an LACPDU packet, full connectivity is restored over VLT uplink LAG 410, instead of over a single link.

Conversely, in situations where uplink VLT LAG 410 receives no LACPDU packets from TOR 428, for example, because TOR 428 has no LACP configuration, then uplink VLT LAG 410 and thus uplink ports 412-414 assume inactive status and no LAG session is established. As a result, due to the UFD feature, the downlink ports 416-418 are kept inactive, too, such that downlink servers 430 have no connectivity to TOR 428 over either IOA1 402 or IOA2 404, even if both IOA1 402 and IOA2 404 are LACP configured.

In one embodiment, in situations when the VLT uplink LAG 410 is no longer inactive, any ingress mask that may be present on the fallback link on the inactive VLT peer is removed in order to allow BUM traffic to pass over ICL 422 nondynamically.

Figure 5:
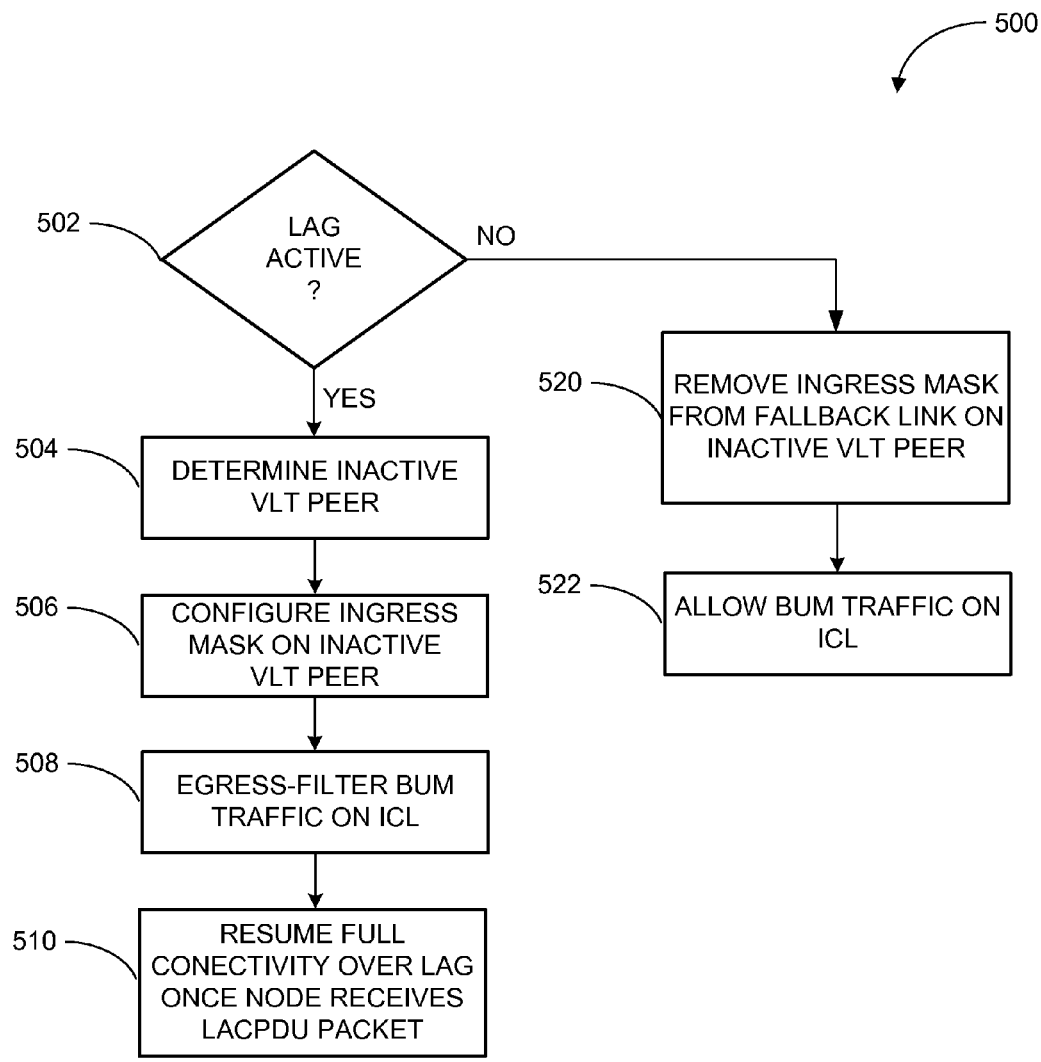
FIG. 5 is an exemplary flowchart illustrating a process to obtain network connectivity using a link-fallback system in a VLT domain that comprises overlapping VLANs, according to various embodiments of the invention.

FIG. 5 is an exemplary flowchart illustrating a process to obtain network connectivity using a link-fallback system in a VLT domain that comprises overlapping VLANs, according to various embodiments of the invention.

At step 502, it is determined whether a LAG is active in the VLT domain. If so, then at step 504, an inactive VLT peer is identified, for example, by a VLT protocol.

At step 506, an ingress mask is configured on the inactive VLT peer to drop ingressing BUM traffic on the fallback link associated with that VLT peer.

At step 508, BUM traffic is egress-filtered on an ICL connected to the node comprising the VLT peer, for example, in order to avoid forwarding of BUM traffic to another VLT peer.

At step 510, once a node receives an LACPDU packet, full connectivity is restored over entire VLT uplink LAG.

At step 520, when the LAG is inactive, an existing ingress mask is removed from the fallback link on the inactive VLT peer, so as to allow BUM traffic over the ICL, at step 522.

It will be appreciated by those skilled in the art that fewer or additional steps may be incorporated with the steps illustrated herein without departing from the scope of the invention. No particular order is implied by the arrangement of blocks within the flowchart or the description herein.

Figure 6:
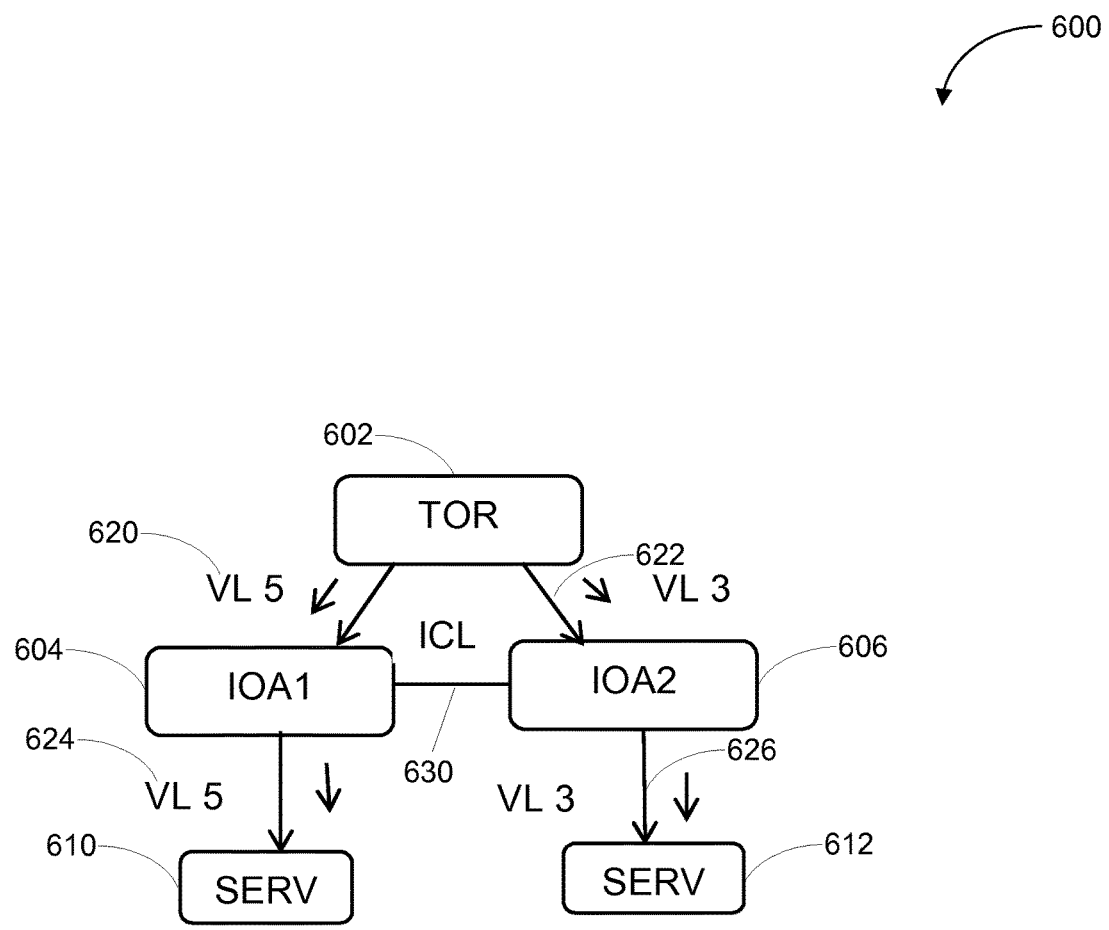
FIG. 6 illustrates an exemplary link-fallback system in a VLT topology comprising disjoint VLANs, according to various embodiments of the invention.

FIG. 6 illustrates an exemplary link-fallback system in a VLT topology comprising disjoint VLANs, according to various embodiments of the invention. System 600 comprises TOR 602, IOA1 604, IOA2 606, uplink ports 620-622, downlink ports 624-626, and downstream servers 610-612. Uplink ports 620-622 are located between IOA1 604 and IOA2 606 and TOR 602. Downlink ports 624-626 are located between IOA1 604 and IOA2 606 and server 610 and 612, respectively. Typically, ICL 630 added as part of that VLAN only when both nodes IOA1 604 and IOA2 606 have a common VLAN. Although IOA1 604 and IOA2 606 are shown to be coupled via ICL 630 in FIG. 6, a VLAN that is present in IOA1 604 is not present in IOA 606 (e.g, VLAN10 present in IOA1 604 is not present in IOA 606), such that VLANs 620-622 are said to be disjoint VLANs.

In operation, IOA1 604 act as VLT node that treats uplink ports 620 as part of a VLT LAG and downlink ports 624 as part of another VLT LAG. Similarly, IOA2 606 treats uplink ports 622 and downlink ports 626 as part of a VLT LAG. For example, IOA1 604 represents VLT node 1 that makes server 610 a member of VLAN 5, while VLT node 3 makes server 612 a member of VLAN 3. The respective uplink LAGs of VLT node 1 and 2 have port-channels that are members of VLAN 5 and VLAN 3, respectively. In one embodiment, in the VLT domain, each VLT node, i.e., IOA1 604 and IOA2 606, independently selects one of its respective operationally active uplink ports 620-622 as a fallback link. Each fallback link is added to its respective LAG in order to carry traffic, thereby, doubling the fallback bandwidth available to system 600.

In one embodiment, since VLANs 620-622 are disjoint, ICL 630 is not programmed to be part of VLAN 620-622. Therefore, BUM traffic is not sent to a VLT peer, rather BUM traffic is handled internally by each node 604, 606 within its own broadcast domain, such that each server's traffic over a VLAN occurs over a dedicated uplink LAG 620-622. As a result, BUM traffic from one disjoint VLAN does not reach the other IOA (e.g., IOA2 606) via ICL 630.

In one embodiment, assuming that IOA1 604 is a member of VLAN10 and IOA2 606 is member of VLAN20, in scenarios where both fallback links of the disjoint VLAN structure 600 are selected, traffic received by one IOA (e.g., IOA1 604) from TOR 602 and traversing ICL 630 is usually not egress-filtered on ICL 630. Instead, in one embodiment, an ingress mark is applied on the uplink LAG, i.e., on the LAG that connects from TOR 602 to the IOA 604, 606, such that any BUM traffic can be dropped. One of the advantages when the set of disjoint VLANs operate in both nodes as shown in this example, the possibility of BUM packet duplication on downstream server 610-612 via ICL 630 and undesired network loops are thus prevented.

Figure 7:
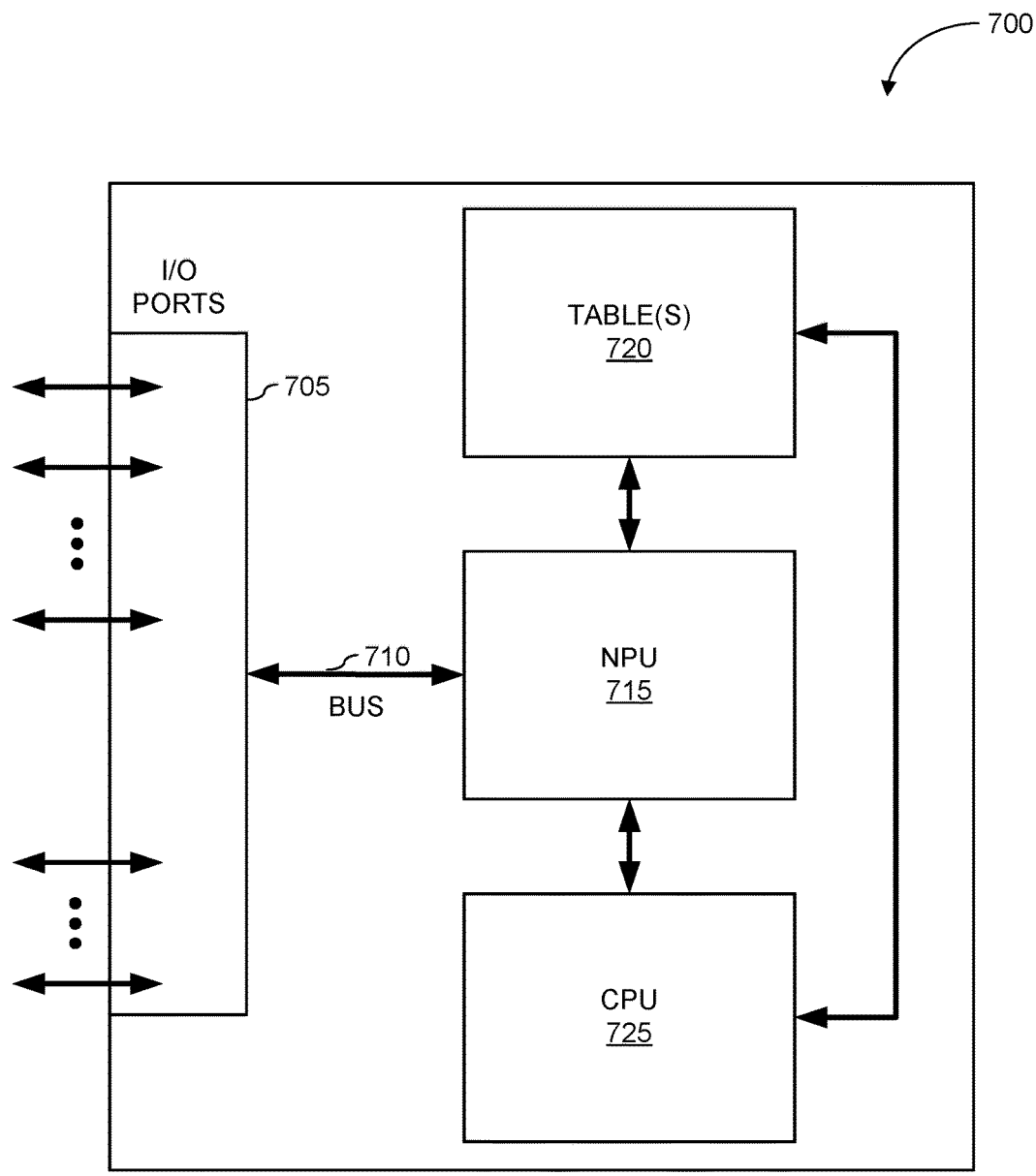
FIG. 7 depicts a simplified block diagram of an IOA using a link-fallback system, according to various embodiments of the present invention.

FIG. 7 depicts a simplified block diagram of an IOA using a link-fallback system, according to various embodiments of the present invention. It is understood that the functionalities shown for device 700 may operate to support various embodiments of link-fallback system—although it is understood that link-fallback system may be differently configured and include different components. System 700 may include a plurality of I/O ports 705, bus 710, network processing unit (NPU) 715, one or more tables 720, and CPU 725. The system includes a power supply (not shown) and may also include other components, which are not shown for sake of simplicity.

In one embodiment, I/O ports 705 are connected via one or more cables to one or more other network devices or clients. Network processing unit 715 may use information included in the network data received at node 700, as well as information stored in table 720, to identify nodes for the network data, among other possible activities. In one embodiment, a switching fabric then schedules the network data for propagation through a node to an egress port for transmission to another node.

It is noted that aspects of the present invention may be encoded on one or more non-transitory computer-readable media with instructions for one or more processors to cause steps to be performed. It is also noted that the non-transitory computer-readable media may include volatile and non-volatile memory. It is noted that alternative implementations are possible, including hardware and software/hardware implementations. Hardware-implemented functions may be realized using ASICs, programmable arrays, digital signal processing circuitry, and the like. Accordingly, the "means" terms in any claims are intended to cover both software and hardware implementations. Similarly, the term "computer-readable medium or media" as used herein includes software and/or hardware having a program of instructions embodied therein, or a combination thereof. With these implementation alternatives in mind, it is understood that the figures and accompanying description provide the functional information one skilled in the art would require to write program code (i.e., software) and/or to fabricate circuits (i.e., hardware) to perform the processing required.

One skilled in the art will recognize that no particular protocol or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

We claim:

1. A method to obtain network connectivity, the method comprising:
   determining at a first network device that links in an uplink Link Aggregation Group (LAG) are inactive in response to the links receiving no Link Aggregation Control Protocol Data Unit (LACPDU) packets on the uplink LAG;
   electing from the links in the uplink LAG a fallback link; and
   adding the fallback link as an operationally active member to the uplink LAG, wherein determining that the links in the uplink LAG are inactive comprises assuming that receiving no LACPDU packets on the uplink LAG at the first network device means no corresponding LAG configuration exists at a second network device that is communicatively coupled with the first network device.

2. The method according to claim 1, further comprising replacing the fallback link with an unelected link.

3. The method according to claim 2, where in the uplink LAG is an LACP LAG.

4. The method according to claim 3, wherein the LACP LAG continues to be active after replacing the fallback link to maintain network connectivity.

5. The method according to claim 1, wherein electing the fallback link comprises electing a static link.

6. The method according to claim 1, further comprising using the unelected link to perform LAG functions.

7. The method according to claim 1, further comprising selecting the uplink LAG to communicate between nodes in a network comprising disjoint Virtual Local Area Networks (VLANs) to prevent network traffic that carries a predetermined content from crossing over an Inter-Chassis Link (ICL).

8. A link-fallback system comprising:
   a first network device configured to couple to downlink ports and to an uplink Link Aggregation Group (LAG), the first network device performs the steps of:
   electing a fallback link from the uplink LAG in response to receiving no Link Aggregation Control Protocol Data Unit (LACPDU) packets; and
   adding the fallback link as an operationally active member to the LAG to maintain a LAG behavior, wherein the first network device is configured to add a static link as an operationally active member to the uplink LAG and replace the elected link as an operational link with an unelected link in response to the unelected link receiving one of broadcast, unknown unicast, and multicast traffic.

9. The system according to claim 8, wherein the first network device has an LACP configuration; and wherein the uplink LAG is an LACP LAG.

10. The system according to claim 9, wherein the links in the LACP LAG have an L2 connection to a peer.

11. A method to obtain network connectivity, the method comprising:

determining at a first network device that a Link Aggregation Group (LAG) configuration for a set of links for forming a Link Aggregation Group between the first device and a second device has no corresponding LAG configuration on the second device;

in response to determining that the first network device configuration has no corresponding LAG configuration on the second device, electing from links between the first and second network devices a fallback link; and adding the fallback link as an operationally active member to the LAG.

12. The method according to claim 11, further comprising replacing the fallback link with an unelected link.

13. The method according to claim 12, further comprising using the unelected link to perform LAG functions.

14. The method according to claim 12, wherein the step of determining at a first network device that a Link Aggregation Group (LAG) configuration for a set of links for forming a Link Aggregation Group between the first device and a second device has no corresponding LAG configuration on the second device comprises determining that the first network devices has not received Link Aggregation Control Protocol Data Unit (LACPDU) packets via the set of links.

15. The method according to claim 14, wherein the LACP LAG continues to be active after replacing the fallback link to maintain network connectivity.

16. The method according to claim 11, wherein electing the fallback link comprises electing a static link.

\* \* \* \* \*